R. D. GRAY.
LENS SYSTEM.
APPLICATION FILED MAR. 22, 1911.
1,053,128.
Patented Feb. 11, 1913.
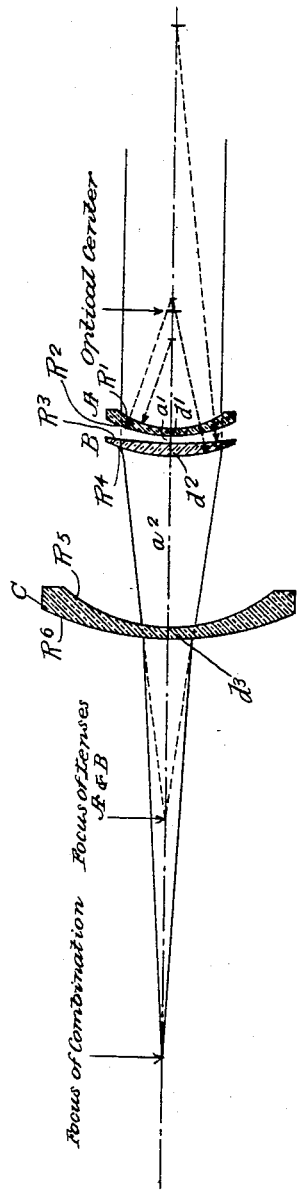

UNITED STATES PATENT OFFICE.

ROBERT D. GRAY, OF RIDGEWOOD, NEW JERSEY.

LENS SYSTEM.

1,053,128.  Specification of Letters Patent.  Patented Feb. 11, 1913.

Application filed March 22, 1911. Serial No. 616,074.

*To all whom it may concern:*

Be it known that I, ROBERT D. GRAY, a citizen of the United States, and a resident of Ridgewood, in the county of Bergen and State of New Jersey, have invented a new and Improved Lens System, of which the following is a full, clear, and exact description.

The invention relates to photographic objectives, and its objective is to provide a new and improved lens system, more especially designed for use in objectives of tele-photographic cameras, and arranged to overcome astigmatism, curved field, spherical and chromatic aberration and other defects, such as are frequently found in lenses used in apparatus of the class mentioned.

In order to accomplish the desired result, the objective is formed of three simple uncemented meniscus lenses in axial alinement, and of which the middle one is a collecting lens and the other two are dispersing lenses having sufficient dispersive power to achromatize the collecting lens.

A practical embodiment of the invention is represented in the accompanying drawing, in which the figure is a sectional side elevation of the lenses forming the objective.

The three lenses A, B and C, forming the objectives of a tele-photographic camera, are spaced apart, and the lens A is a dispersing flint glass lens, the lens B is a collecting crown glass lens, and the lens C is a dispersing lens, and is movable toward and from the lenses B and A to vary the focus. The dispersing lenses A and C are jointly of sufficient dispersive power to achromatize the collecting lens B, and in order to produce the desired rectilinearity, the lenses A and B together have a focal length approximately half of the complete objective. The lenses A and B together produce the well known barrel distortion, which is corrected by the lens C acting in a contrary direction, the lens C at the same time lengthening the focus of the oblique rays relatively more than those along the optical axis, which produces a flat field and places the optical center forward of the first lens A. It is understood that the three lenses A, B and C are separated by air spaces and their curvatures extend all in the same direction, and the curvatures radiate from the side of the lens system on which the optical center is situated. By reference to the drawing, it will be noticed also that the concave surface of the first lens A is of shorter radius than the convex surface of the collecting lens B.

It is understood that the lens B is a positive collecting lens and the minus meniscus lens A is placed in front of the said positive collecting lens while the other minus meniscus lens C is placed in the rear of the said positive collecting lens B. The concave surface of the said front minus meniscus lens has a shorter radius than the radius of the convex surface of the said positive collecting lens. It will also be noticed that the front minus meniscus lens A and the said positive collecting meniscus lens B have jointly a positive focal length approximately one-half of the system, and the equivalent length of the system is positive.

The reference letters $d'$, $d^2$ and $d^3$ signify the thickness of the lenses A, B and C at the axis, the letters $R'$ $R^2$, $R^3$, $R^4$, $R^5$ and $R^6$ indicate the radii of the lens surfaces, and the letters $a'$ and $a^2$ indicate the axial distances between the facing surfaces of the lenses A, B and C, respectively. The numerical values of the radii, the thicknesses and the distances relative to the focal length of the whole system, as shown in the drawing, are calculated for a 10-inch focus.

Air spaces.
$a'$ .1081 (variable)
$a^2$ .9456 (variable)

Thickness 10-inch lens.
$d^3$ .0135
$d^2$ .0243
$d'$ .0067

Radii for 10-inch focus.
$R'$ 1.081
$R^2$ 1.541
$R^3$ 16.217
$R^4$ 1.676
$R^5$ 1.728
$R^6$ 3.216

Glasses used.

| | A. | B. | C. |
|---|---|---|---|
| $n_D$ | 1.54185 | 1.61159 | 1.62253 |
| $n_F$ | 1.54944 | 1.61897 | 1.63493 |
| $n_G$ | 1.55613 | 1.62492 | 1.64549 |

Having thus described my invention, I claims as new and desire to secure by Letters Patent:

1. A lens system for photographic objectives, comprising a positive collecting meniscus lens and two minus meniscus lenses, one in front and one in the rear of the said positive collecting lens, the lenses having air spaces between them, the concave surface of the said front minus meniscus lens having a shorter radius than the radius of the convex surface of the said positive collecting lens, the equivalent focal length of the system being positive, the said front minus meniscus lens and the said positive collecting meniscus lens having jointly a positive focal length approximately one-half of that of the system.

2. A lens system for photographic objectives, comprising a positive collecting meniscus lens and two minus meniscus lenses, one in front and one in the rear of the said positive collecting lens, the lenses having air spaces between them, the concave surface of the said front minus meniscus lens having a shorter radius than the radius of the convex surface of the said positive collecting lens, the equivalent focal length of the system being positive, the said front minus meniscus lens and the said positive collecting meniscus lens having jointly a positive focal length approximately one-half of that of the system, the curvatures of all the lenses being in the same direction.

3. A lens system for photographic objectives, comprising a positive collecting meniscus lens and two minus meniscus lenses, one in front and one in the rear of the said positive collecting lens, the lenses having air spaces between them, the concave surface of the said front minus meniscus lens having a shorter radius than the radius of the convex surface of the said positive collecting lens, the equivalent focal length of the system being positive, the said front minus meniscus lens and the said positive collecting meniscus lens having jointly a positive focal length approximately one-half of that of the system, the said front and rear minus meniscus lenses having jointly sufficient dispersive power to achromatize the system.

In testimony whereof I have signed my name to this specification in the presence of two subscribing witnesses.

ROBERT D. GRAY.

Witnesses:
 THEO. G. HOSTER,
 PHILIP D. ROLLHAUS.

Copies of this patent may be obtained for five cents each, by addressing the "Commissioner of Patents, Washington, D. C."